Patented Sept. 13, 1932

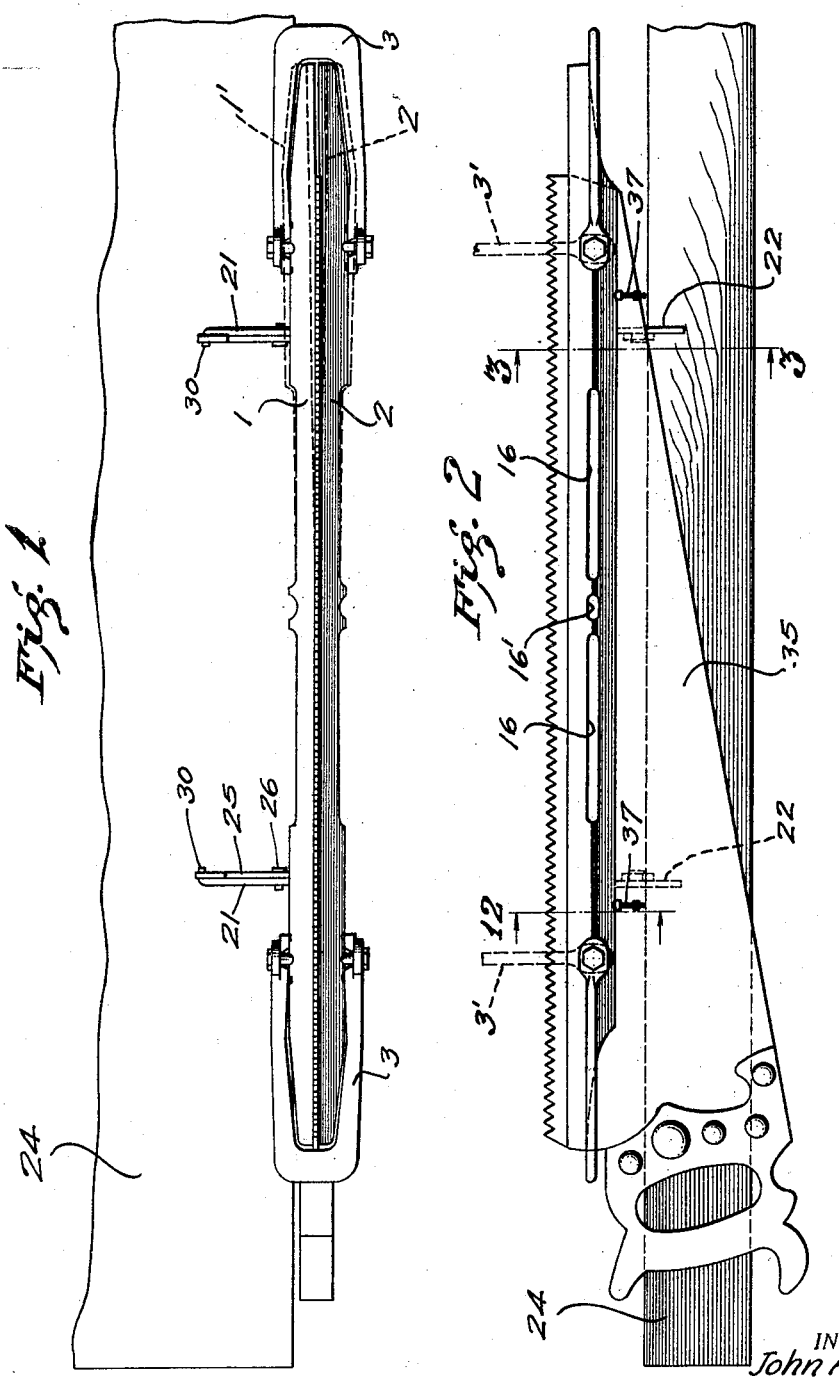

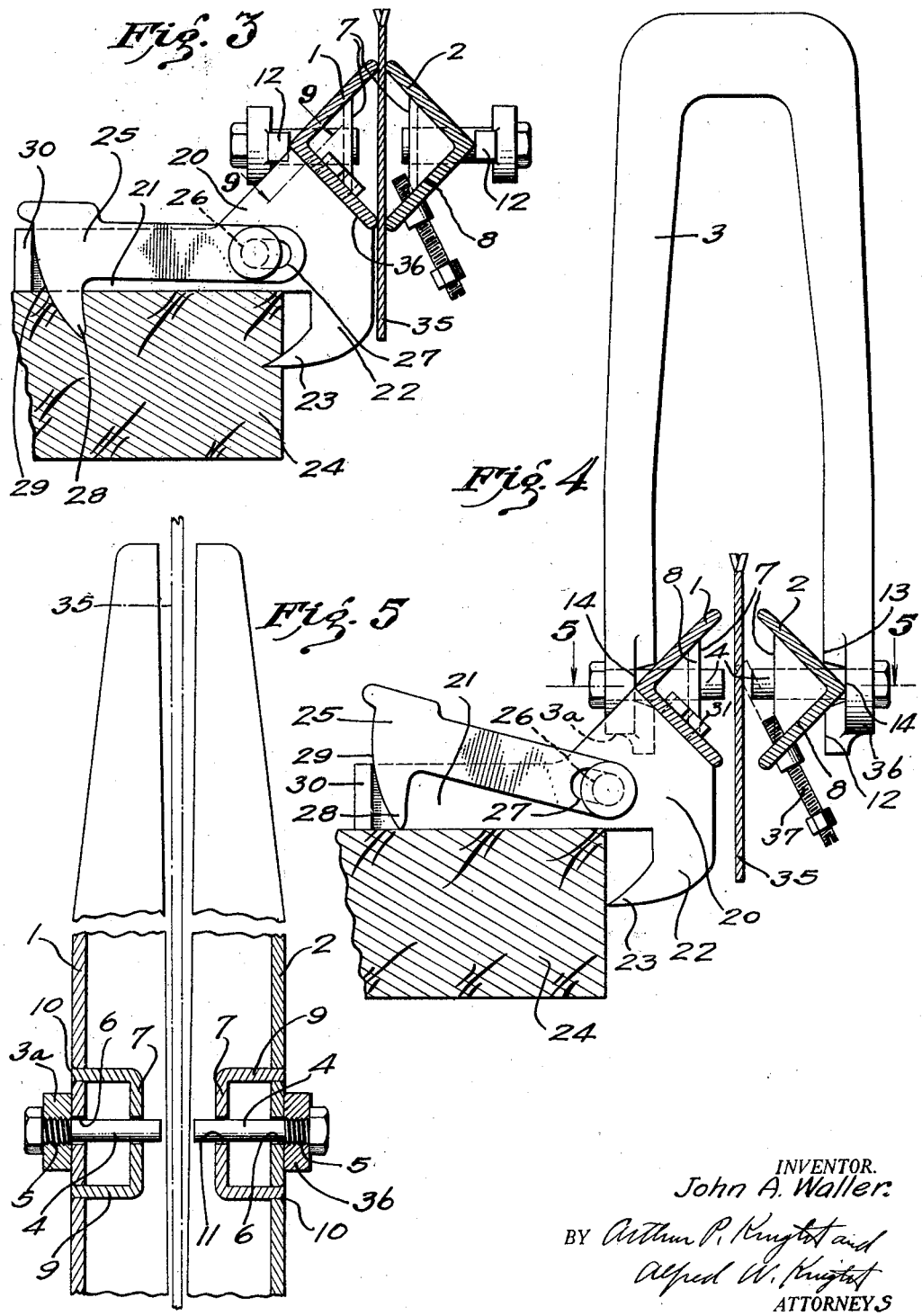

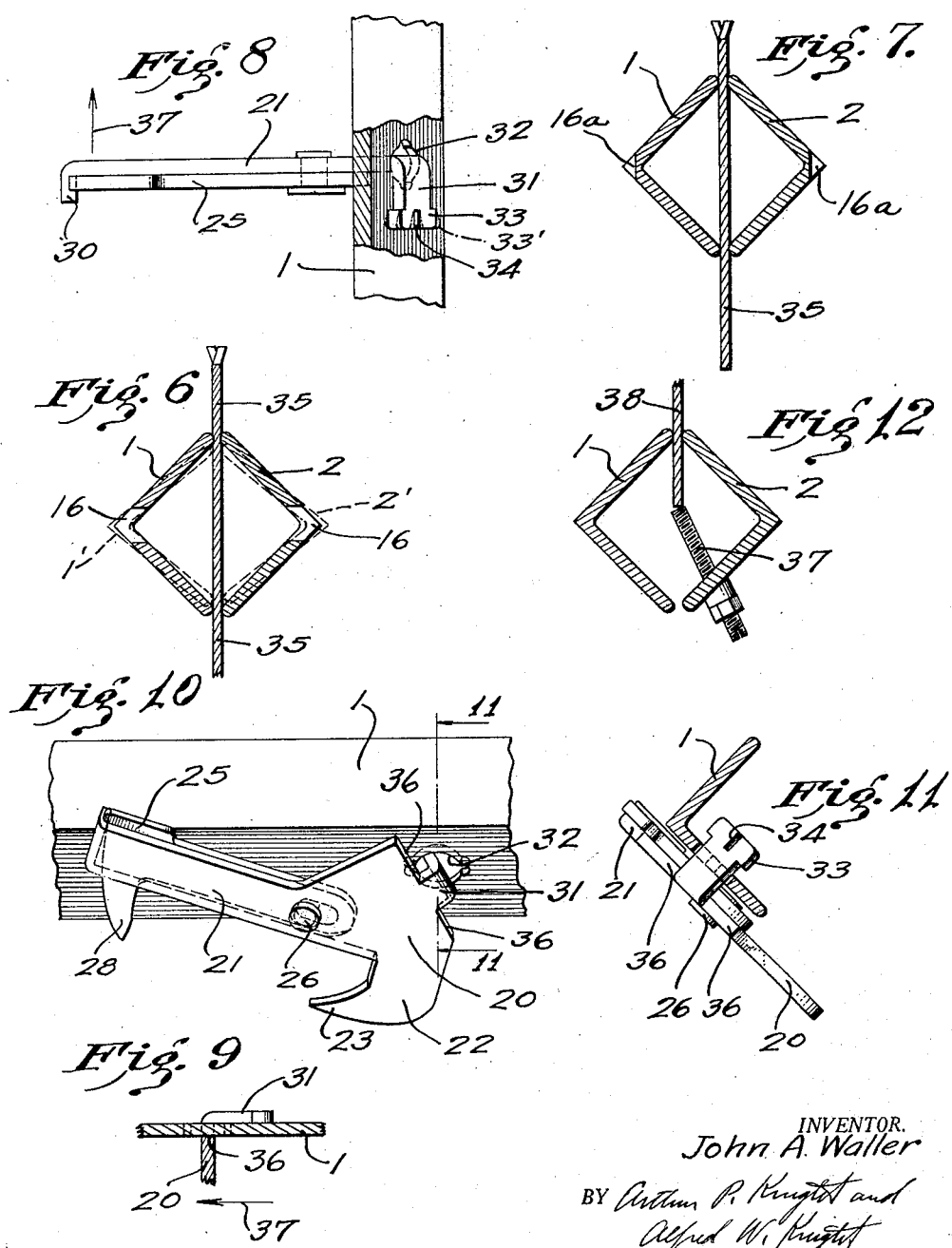

1,877,096

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

SAW CLAMP

Application filed May 26, 1930. Serial No. 455,648.

This invention relates to improvements in saw-clamps, and the main object of the invention is to produce a saw-clamp which will firmly and rigidly support the saw throughout its length and which can be quickly and easily clamped and unclamped.

A particular object of the invention is to provide a saw clamp whose clamping members are adapted to exert a yielding inward pressure on the saw blade so as to clamp the same tightly throughout the entire length of the blade or of such portion thereof as is engaged therebetween, regardless of slight variations in thickness of the blade.

Another object of the invention is to provide a saw-clamp of low cost, which is of strong construction and effective in operation.

A further object of the invention is to provide improved means for mounting the saw-clamp on a bench or the like.

A further object of the invention is to provide means whereby the clamping means may be used to clamp and support a band-saw, as well as an ordinary hand saw.

The saw clamp of my invention comprises essentially two resilient clamp bars extending alongside one another and having opposing clamping faces, said bars being preferably sprung outwardly away from one another at their ends, means for supporting one of said clamp bars, two U-shaped or other suitably shaped operating members embracing the respective ends of said clamp bars and each pivotally connected to both clamp bars and movable into and out of alignment therewith and provided with cam means adapted to engage the adjacent portions of said bars and force the same inwardly upon movement of said operating members to position of such alignment. The clamp bars preferably engage the saw blade only adjacent their upper and lower edges, which constitute the clamping faces, and said bars are cut away or weakened along a longitudinal line intermediate said upper and lower edges and throughout a considerable portion of their length and especially between the points of engagement of the respective operating members therewith, and such cutting away or weakening is preferably so designed as to materially reduce the stiffness of said bars transversely thereof and thus permit transverse yielding, or spreading apart of the upper and lower edge portions thereof, upon engagement with the saw blade, without unduly reducing the longitudinal rigidity thereof.

With this in view, said clamp bars are advantageously formed as angle bars with their salient edges disposed outwardly and their re-entrant angles and upper and lower edges facing inwardly toward one another, and are provided with longitudinal slots or other openings, or with grooves or depressions, disposed along the length thereof and at the angle or junction of the two oppositely flaring members or portions thereof. Said slots, openings, grooves or depressions so disposed weaken the bars transversely, so as to permit the two flaring members of each bar to spread or yield to varying degrees at different points longitudinally thereof and compensate for inequalities in thickness of the saw blade, or slight irregularities in the clamping faces of the bars, and yet permit the longitudinal stiffness of the bars to be preserved to a sufficient extent to exert the desired inward clamping pressure throughout their length when the ends thereof are forced together by the cam means of the operating members.

The cam means on the operating members preferably constitute projecting lugs or portions on each arm of each operating member, at each side of the pivotal connection thereof to the respective clamping bars, and said arms recessed between the respective projections, so that when the arms of the operating members are brought into alignment with the clamping bars the projections engage the salient edges of the clamping bars and force the same inwardly, but when said arms are moved out of such alignment the resiliency of the clamping bars causes them to spring outwardly and bring the salient angles into the recessed portions of said arms, and the oppositely inclined outer faces of the clamp bars into engagement with the adjacent projections on said seams, thus holding the operating members in this latter position until forcibly moved to clamping position.

Means are also provided for mounting the saw-clamp on a work bench or other suitable support, said mounting means preferably comprising two brackets movably connected to one of the clamp bars and adapted to be folded to positions alongside the clamps and also to be swung outwardly to positions substantially perpendicular to the length of the clamp. Each mounting bracket is provided with means, preferably of the construction hereinafter described, for quickly and easily securing the same to a work bench when in said last-named position, and is adapted, when so secured, to rigidly hold the clamp in position.

The accompanying drawings illustrate my invention, and referring thereto:

Fig. 1 is a plan view of the clamp in position on a bench, with a hand saw mounted therein.

Fig. 2 is a side elevation thereof.

Fig. 3 is a section on line 3—3 in Fig. 2, with the parts in operative clamping position.

Fig. 4 is a section similar to Fig. 3, showing the parts in inoperative position.

Fig. 5 is a section on line 5—5 in Fig. 4.

Fig. 6 is a section on line 6—6 in Fig. 2, illustrating the transverse spreading of the clamp bars.

Fig. 7 is a similar view showing a modified means of weakening the clamp bars to permit spreading thereof.

Fig. 8 is a partly sectional plan view of one of the mounting brackets and the adjacent part of the clamp bar to which it is connected.

Fig. 9 is a partial section on line 9—9 in Fig. 3, showing the engagement of the bracket with the clamp bar when in position for mounting.

Fig. 10 is a side elevation of one of the mounting brackets folded to position alongside the clamp bar.

Fig. 11 is a section on line 11—11 in Fig. 10.

Fig. 12 is a section on line 12—12 in Fig. 2 but with a band saw blade mounted in the clamp instead of a hand saw.

My improved saw clamp comprises two clamp bars 1 and 2, each consisting preferably of a length of angle bar of resilient steel or other metal, extending alongside one another and with their reentrant angles facing one another so that the saw may be clamped between the aligned upper and lower edges of said bars. Said bars are sprung or bent outwardly at each end as shown in dotted lines at 1' and 2' in Fig. 1 and operating members 3, consisting preferably of U-shaped members of resilient steel or other metal, are pivotally connected to the respective bars adjacent the ends thereof and are provided with suitable cam means for forcing the bars inwardly to clamp the saw.

The pivotal connection of each operating member to the clamp bars may be effected by aligned pivot members 4 serving to pivotally connect each of the arms 3a and 3b of the operating member to the clamp bars 1 and 2 respectively while permitting relative inward and outward movement of the clamp bars with respect to said arms upon engagement and disengagement of the cam means of said operating members with said clamp bars. The pivot members 4 may comprise, for example, bolts or pins threadedly secured as at 5 to the respective arms 3a and 3b of the operating members and passing loosely through aligned openings 6 adjacent the angle of the angle bars. In order to further strengthen the clamp bars adjacent the point of engagement of the operating members therewith, and to also provide a better support for the pivot members 4, I may also provide reenforcing plates 7 secured to the respective clamp bars within the reentrant angle thereof. Each of said reenforcing plates abuts against the upper and lower portion of each clamp bar, as shown at 8 and is bent outwardly at its ends as at 9, the extremities of the outwardly bent portions being secured to the clamp bars as, for example, by riveting or upsetting the same at the opposite face of the clamp bars as shown at 10. Each reenforcing plate is provided with an opening 11 through which the corresponding pivot member 4 passes. Each arm of each operating member is provided with two lugs or projections 12 and 13 at the respective sides of the pivot member, while said arms are recessed or cut away between said projections as shown at 14, so as to provide a notch of sufficient depth and width to permit outward movement of the clamp bars when the operating members are raised so as to bring the projections 12 and 13 out of engagement with the salient edges of the clamp bars, as shown, for example, in Fig. 4.

Each of the clamp bars 1 and 2 is weakened transversely, as by providing the same with perforations, openings, grooves or depressions disposed at or adjacent the angle thereof and extending throughout a considerable portion of the length thereof, and preferably throughout the major portion of the distance between the points of engagement of the respective operating members thereto. Such weakening is shown in Figs. 1, 2 and 6, as provided by longitudinal slots 16 extending through the respective clamp bars at the angle or junction of the oppositely flaring portions or members of said bars. In these figures I have shown a relatively short slot or opening 16' interposed between the two main slots 16 of each bar, but it will be understood that the opening 16' may be omitted or that the two slots 16 may be combined to form a single slot extending throughout the major portion of the distance between the two operating members. As shown in Fig. 7, a similar weakening effect may be secured by merely grooving, recessing, or partially cutting away or reducing the thickness of the clamp bars at the angle thereof, as indicated at 16a.

In order to mount the saw clamp on a work bench or other suitable support, one of the clamping bars, such as the bar 1, is provided with two or more supporting brackets 20 which are preferably movably connected thereto. Each of said brackets is provided with a horizontal arm 21 and a vertical arm 22, and said bracket is preferably so mounted on the clamp bar as to permit the bracket to be folded to position against or alongside the clamp bar, as shown in Figs. 10 and 11, and also to be swung outwardly to a position substantially perpendicular to said clamp bar. For this purpose the bracket 20 is shown as provided at its inner end with a lug 31 projecting substantially perpendicularly therefrom and the clamp bar 1 is provided with an opening 32 adapted to permit inward and outward movement of said lug therein upon swinging of said bracket between said two positions. The end of lug 31 may be enlarged as shown at 33 so as to tend to prevent complete removal of the bracket from the clamp bar. When originally assembled, however, said enlargement on lug 31 should not be sufficient to prevent insertion of said lug through the opening 32. In order that the parts may be assembled in this manner and the enlargement may still serve effectively to prevent subsequent accidental disengagement of the bracket from the clamp bar, the opening 32 may be made of somewhat greater length in a direction perpendicular to the normal position of lug 31 therein (see Fig. 8), so that by turning the lug at right angles to its normal position and by canting the same slightly, if necessary, the enlargement 32 may be passed through this opening, but when the lug is turned to its normal position in the opening the enlargement 33 will be prevented from removal through the smaller dimension of said opening, whether the bracket is in supporting position as shown in Fig. 8 or in position alongside the clamp bar as shown in Figs. 10 and 11. In order to provide for more positively preventing subsequent removal of the supporting bracket from the clamp bar, the end of lug 31 may, if desired, be slotted or notched as shown at 34 in Fig. 8, so that after the bracket is connected to the clamp bar, as above described, a wedge or other suitable tool may be driven into said notch so as to further spread the end portion of said lug as indicated in dotted lines at 33'.

The bracket 20 is provided adjacent the base of lug 31 with shoulders 36 at opposite sides of said lug adapted to bear against the face of the clamping bar 1 when the bracket is moved to supporting position. As shown in Fig. 9, said shoulders are displaced from the plane of the adjacent face of lug 31 by a distance substantially equal to the thickness of the clamping bar 1, so that when the bracket is swung outwardly in the direction indicated by the arrow at 37 in Figs. 8 and 9, the clamp bar is rigidly held between lug 31 and shoulders 36. When in said position the horizontal arm 21 of the bracket is adapted to rest on top of a bench or other suitable support, while the vertical arm 22 extends downwardly in front of the bench.

Arm 22 is provided with an inwardly extending prong or tooth 23 adapted to be forced into the front of the bench indicated at 24. A dog member 25 is mounted on the horizontal arm 21 of each bracket by means permitting pivotal movement thereof in a vertical plane and also permitting relative inward and outward movement of said dog and arm. The mounting means for said dog may comprise, for example, a pivot pin 26 mounted on arm 21 and extending through a slot 27 in dog 25, said pin having headed ends or the like for retaining it in position. Said dog member has a tooth or prong 28 adapted to enter the top of the bench. The outer end of dog member 25 is formed with an inclined or cam face 29 adapted to engage a shoulder 30 on bracket arm 21 to force the dog member outwardly toward the clamp bar 1 and thereby draw the clamp bars and bracket inwardly toward the work bench, when the dog member is forced from the position shown in Fig. 4 to the position shown in Fig. 3, so as to cause tooth 23 on the vertical arm 22 to enter the front of the bench at the same time that the tooth 28 on the dog member 25 enters the top of the bench. By this means the saw clamp may be quickly positioned on the bench and may be mounted rigidly in position by simply driving down the dog member 25, for example, by means of a hammer. Each bracket is forcibly pressed in the direction indicated by the arrow at 37 in Figs. 8 and 9 during the securing thereof to the bench, in order to bring lug 31 and shoulders into tight engagement with the clamp bar 1, and thus rigidly hold the entire clamp in position.

The above described saw clamp may be used as follows, the clamp having been mounted on the work bench 24 in the manner above described. The U-shaped operating members 3 are raised to an upright or vertical position as shown in dotted lines at 3' in Fig. 2, and as also shown in Fig. 4, so as to remove the lugs or projections 12 or 13 thereon from engagement with the salient angles of the respective clamp bars and permit the end portions of the clamp bars to spring apart as shown in Figs. 4 and 5 and in dotted lines at 1' and 2' in Fig. 1. At this time the salient angles of the clamp bars enter the recesses or notches 14 on the arms 3a and 3b of each operating member, and said recesses are of sufficient depth to permit the clamping bars 1 and 2 to be separated from one another throughout their length, sufficiently to receive the blade of the saw, indicated at 35, when the operating members are in this raised or inoperative position. It will be noted that when the operating members are in raised position, the salient angles of the clamp bars are held in position in the respective notches 14 by the resilience of the clamp bars themselves, while the projections 12 and 13 engage the upper and lower faces of the clamp bars and serve to hold the operating members in this position until they are forcibly lowered.

The saw blade having been inserted in the proper position between the clamp bars, the operating members 3 are forced down to position to bring the arms 3a and 3b thereof into substantial alignment with the salient angles of the clamp bars, thus causing the projections or lugs 12 and 13 on said arms to bear against the lower and upper faces respectively, and eventually upon the salient angle or edge itself, of the respective clamp bars and force said clamp bars inwardly toward one another in such manner as to clamp and firmly hold the saw between the aligned upper and lower edges of the two clamp bars, as shown, for example, in Fig. 3. To unclamp the saw it is merely necessary to release the pressure upon the clamp bars.

Fig. 6 illustrates particularly the manner in which the clamp bars are enabled to yield or spread transversely in order to compensate for inequalities in thickness of the saw blade. In this figure the relative normal positions of the clamp bars are shown in dotted lines at 1' and 2'. In case the portion of the saw blade through which this section is taken is of slightly greater thickness than portions at either side thereof, or in case the inner faces of the clamp bars are not exactly true so that when the inner ends of the clamp bars are forced inwardly these particular portions of such faces tend to be forced to close together, the slots 16 at the salient edges of the bars permit the same to spread or bend transversely about the angle of junction of the two side portions of each bar, and assume some such position as shown in full lines at 1 and 2. The degree to which such spreading actually occurs is in actual practice usually very slight but is exaggerated in this figure for the purpose of illustration. Different portions of the bars, along the length thereof, may thus yield or spread to different degrees in accordance with variations in thickness of the saw blade or variations in the distance between the inner faces of the clamp bars, so that the saw blade is thus clamped closely at all points throughout the length thereof between the points of engagement of the two operating members with the clamp bars. It is evident from Fig. 7 that the weakening of bars at the angles thereof, by merely cutting away a portion of the metal, will act in a similar manner to permit transverse spreading thereof.

In order to adapt the above described saw clamp for the clamping of band saws, I may provide adjustable rests or supporting members which are adapted to be moved into or out of position to support the lower edge of a band saw. Such adjustable supporting members are shown as comprising screws 37 threadedly mounted in one of the clamp bars and preferably in the outer clamp bar 2. Said screws are shown as screwing through the lower portion of the clamp bar 2 and being inclined inwardly and upwardly, so that when retracted as shown in Figs. 3 and 4 they are removed from the position occupied by an inclined saw blade clamped between the clamp bars, but when screwed inwardly they are advanced to the position shown in Fig. 12, so that the upper ends thereof are in position to support the lower edge of a band saw indicated at 38. Said screws may be provided with lock nuts for holding them in either retracted or advanced position. When these supporting members are in advanced or raised position, a band saw may be clamped between the upper edges of the two clamp bars by operation of the operating members in substantially the same manner as before, with the exception that the operating members are released to permit insertion or removal of the band saw by lowering the same to position below the clamping bars and are then raised upwardly to horizontal position to effect the clamping operation because the extension of the band saw beyond the ends of the clamp bars prevents movement of the operating members between horizontal position and a position above the clamp bars.

I claim:

1. In a saw clamp, two clamp bars extending side by side, means engaging the respective bars adjacent the ends thereof and operable to one position to permit separation of the bars and insertion of a saw blade therebetween and to another position to force the bars inwardly to clamp said saw blade therebetween, said clamp bars being formed as angle bars with their salient angles disposed outwardly and with the edges of the two flaring portions thereof in substantial alignment with one another to clamp the saw, said clamp bars being weakened in cross-section adjacent the salient angles thereof and throughout the major portion of the distance between the points of engagement of the means for forcing said clamp members inwardly.

2. In a saw clamp, a construction as set forth in claim 1, said clamp bars being provided with openings disposed along the length thereof and adjacent said salient angles so as to permit transverse spreading of the flaring portions of said clamp bars in case of resistance to inward movement thereof.

3. In a saw clamp, two clamp bars extending side by side, operating members at the respective ends of said bars and each pivotally connected to both clamp bars for movement into and out of alignment with said operating members and each provided with cam means adapted to engage the outer faces of said clamp bars and force the bars inwardly to clamping position upon movement into substantial alignment with said clamp bars, said clamp bars being formed as angle bars with their salient angles disposed outwardly and being provided with openings disposed along the length thereof and adjacent said salient angles so as to permit transverse spreading of the upper and lower portions of said clamp bars in case of resistance to inward movement thereof.

4. In a saw clamp, two resilient clamp bars extending side by side and having their end portions sprung outwardly from one another, operating members at the respective ends of said clamp bars and each pivotally connected to both clamp bars for movement into and out of alignment with said operating members and each provided with cam means adapted to engage the outer faces of said clamp bars and force the bars inwardly to clamping position upon movement into substantial alignment with said clamp bars, said clamp bars being formed as angle bars with their salient angles disposed outwardly and being provided with openings disposed along the length thereof and adjacent said salient angles so as to permit transverse spreading of the upper and lower portions of said clamp bars in case of resistance to inward movement thereof.

5. In a saw clamp, two clamp members extending side by side, means for forcing said clamp members together to clamp a saw therebetween, two supporting brackets movably connected to one of said clamping members in such manner as to permit movement thereof from position alongside said clamping member to a position extending substantially perpendicularly therefrom, each of said supporting brackets being provided with means adapted to engage the upper and forward surfaces of a suitable support and with means for securing the same to said support when in said extended position, and each of said supporting brackets being also provided with shoulders adapted to engage the inner and outer faces of said one clamping member when in said extended position so as to rigidly position said clamping member with respect to said suporting brackets.

In testimony whereof I have hereunto subscribed my name this 13th day of May, 1930.

JOHN A. WALLER.